United States Patent
Hall

(10) Patent No.: US 6,859,859 B2
(45) Date of Patent: Feb. 22, 2005

(54) METHOD AND SYSTEM FOR EFFICIENTLY CALCULATING AND STORING EXPECTED ACCESS TIME INFORMATION FOR DASD

(75) Inventor: David Robison Hall, Rochester, MN (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 250 days.

(21) Appl. No.: 10/215,403

(22) Filed: Aug. 8, 2002

(65) Prior Publication Data

US 2004/0030827 A1 Feb. 12, 2004

(51) Int. Cl.[7] ............................................... G06F 13/14
(52) U.S. Cl. ..................................... 711/112; 711/111
(58) Field of Search .................. 711/111, 112; 360/75, 360/77.04, 78.01, 78.04; 369/43, 47.38

(56) References Cited

U.S. PATENT DOCUMENTS

| | | | | |
|---|---|---|---|---|
| 5,570,332 A | * | 10/1996 | Heath et al. | 369/30.1 |
| 6,574,676 B1 | * | 6/2003 | Megiddo | 710/5 |
| 6,604,178 B1 | * | 8/2003 | Hall | 711/167 |
| 6,681,289 B2 | * | 1/2004 | Espeseth et al. | 711/112 |
| 6,725,327 B1 | * | 4/2004 | Espeseth et al. | 711/112 |

* cited by examiner

*Primary Examiner*—Gary Portka
(74) *Attorney, Agent, or Firm*—Joan Pennington

(57) ABSTRACT

A method and apparatus are provided for command queue ordering in a direct access storage device (DASD). For each command in a command queue, an access time is calculated. Calculating the access time includes identifying a probability of miss and adding a penalty for the identified probability of miss to the calculated access time. A command in the command queue having a best access time is identified and executed.

19 Claims, 8 Drawing Sheets

PRIOR ART

ARRIVAL BANDS (SIDs) 132

| SEEK DISTANCE (CYLINDER GROUPS) 134 | 0-2 MAKE | 0-2 MISS | 3-5 MAKE | 3-5 MISS | 6-8 MAKE | 6-8 MISS | 9 MAKE | 9 MISS |
|---|---|---|---|---|---|---|---|---|
| 0-30 | 4 | 2 | 9 | 0 | 4 | 0 | 72 | 6 |
| 31-91 | 4 | 1 | 6 | 0 | 2 | 0 | 98 | 5 |
| 92-182 | 9 | 7 | 5 | 0 | 4 | 0 | 150 | 4 |
| 183-303 | 27 | 5 | 13 | 1 | 15 | 1 | 208 | 4 |
| 304-454 | 36 | 5 | 16 | 1 | 14 | 4 | 236 | 11 |
| 455-635 | 21 | 10 | 8 | 7 | 15 | 6 | 224 | 14 |
| 636-846 | 23 | 11 | 18 | 2 | 14 | 2 | 153 | 8 |
| 847-1087 | 42 | 13 | 14 | 3 | 10 | 2 | 173 | 6 |
| 1088-1358 | 42 | 13 | 18 | 3 | 17 | 2 | 221 | 8 |
| 1359-1559 | 62 | 19 | 26 | 3 | 30 | 3 | 238 | 7 |
| 1560-1990 | 67 | 25 | 22 | 1 | 22 | 2 | 163 | 3 |

FIG. 1B

126       TIMED-BASED RELOCATION EXPECTED
ACCESS TIME (TREAT)

| CYLINDER GROUPS 134 | 75% | 50% | 40% | 30% | 20% | 15% | 10% | 5% | DIST. | NO. OF ACCESSES |
|---|---|---|---|---|---|---|---|---|---|---|
| 0-10 | 6 | 12 | 14 | 15 | 17 | 18 | 20 | 24 | 13 | 462 |
| 11-50 | 7 | 10 | 12 | 13 | 16 | 20 | 21 | 22 | 61 | 810 |
| 51-100 | 12 | 15 | 18 | 21 | 24 | 27 | 30 | 35 | 54 | 934 |
| 101-175 | 8 | 11 | 12 | 14 | 17 | 21 | 22 | 23 | 19 | 1298 |
| 176-275 | 12 | 13 | 14 | 16 | 18 | 20 | 24 | 28 | 19 | 1400 |
| 276-400 | 9 | 10 | 11 | 14 | 16 | 18 | 22 | 26 | 16 | 382 |
| 401-550 | 6 | 8 | 10 | 13 | 14 | 17 | 20 | 22 | 4 | 123 |
| 551-625 | 6 | 9 | 10 | 12 | 14 | 18 | 20 | 23 | 12 | 98 |
| * * * | | | | | | | | | | |
| NO. OF ACCESSES | 102 | 365 | 468 | 531 | 910 | 812 | 1231 | 1088 | | |

FIG. 1C

140       PENALTY TABLE

| EAT % 142 | 75% | 50% | 40% | 30% | 20% | 15% | 10% | 5% |
|---|---|---|---|---|---|---|---|---|
| PENALTY (SIDs) 144 | 375 | 250 | 200 | 150 | 100 | 75 | 50 | 25 |

FIG. 1D

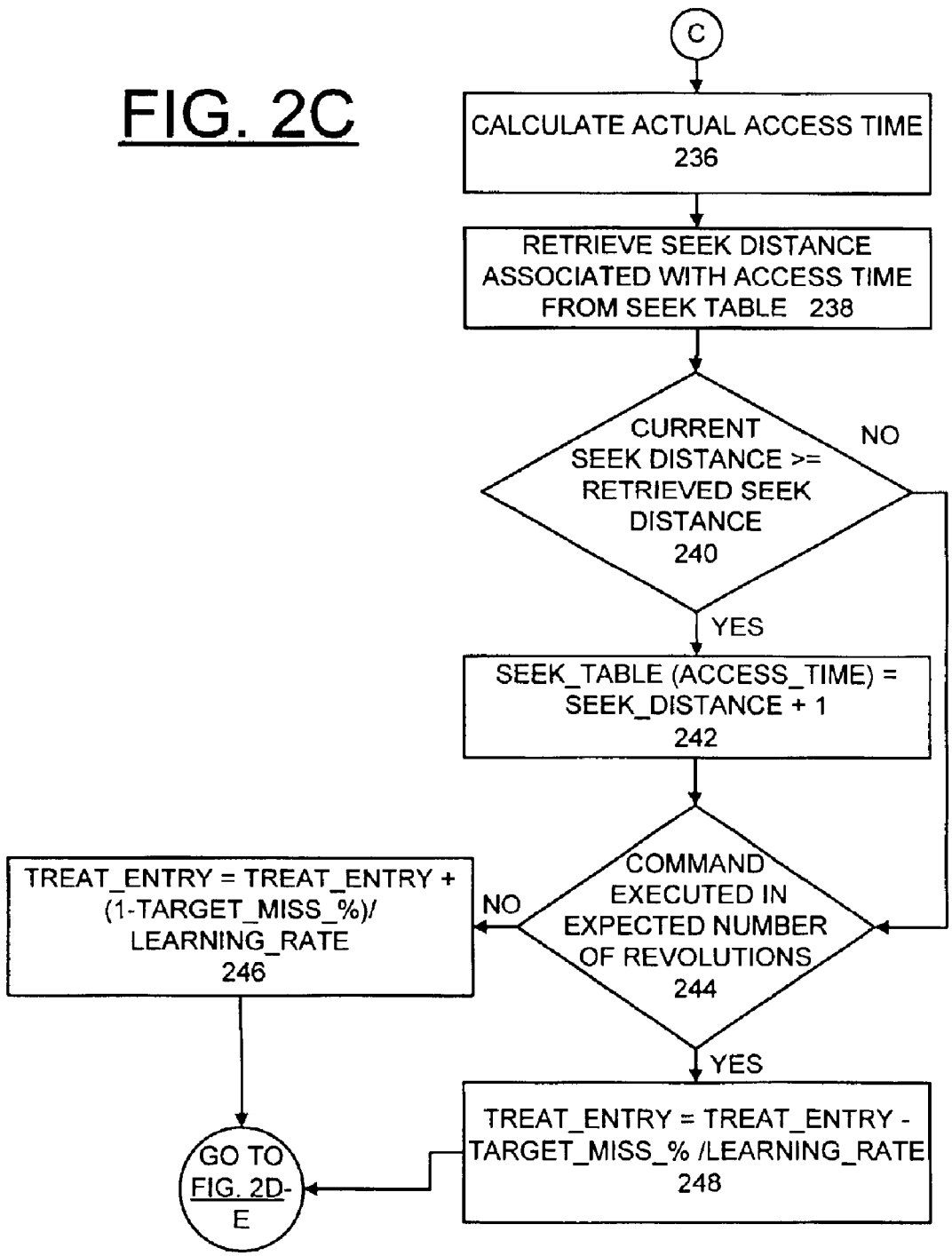

METHOD AND SYSTEM FOR EFFICIENTLY CALCULATING AND STORING EXPECTED ACCESS TIME INFORMATION FOR DASD

FIELD OF THE INVENTION

The present invention relates generally to command queue ordering in a direct access storage device (DASD), and more particularly, relates to a method and apparatus for efficiently calculating and storing expected access time information for a direct access storage device (DASD).

DESCRIPTION OF THE RELATED ART

In DASDs or hard disk drives, when there are more than one command to execute, the data to be accessed next is chosen from a list or a queue of outstanding commands. When a hard disk drive has more than one command to execute, the commands are placed in a queue from which the next command is chosen. A Rotational Position Optimization (RPO) algorithm is used to reorder the commands for execution. Presently, hard disk drives typically use a Shortest Access Time First (SATF) RPO algorithm to determine which command to select.

The conventional SATF algorithm works as follows: Given a set of commands in a queue, a command is chosen that can be started or accessed first. This calculation has two parts, the time to perform the seek and settle operation from the current cylinder to the target cylinder and the latency between this point and when the starting sector for the command is reached. Together those parts make up the estimated access time for each queued command. The SATF algorithm depends on accurate estimates of the access time. If the estimate is too low, the actuator may settle on track after the desired sector has already passed rotationally. This is called a miss. A miss adds one full revolution to the access time, degrading performance. If the access time estimate is too high, the optimal command candidate is not chosen for execution.

One known SATF algorithm chooses the command that has the shortest access time as well as an acceptable probability of success. The probability of success is the probability that the command will be executed in the expected amount of time without one or more missed revolutions.

A need exists for an improved method and apparatus for hard disk drive command queue ordering. It is desirable to provide a method and apparatus for efficiently and effectively calculating and storing expected access time information for a direct access storage device (DASD).

SUMMARY OF THE INVENTION

A principal object of the present invention is to provide a method and apparatus for efficiently and effectively calculating and storing expected access time information for a direct access storage device (DASD). Other important objects of the present invention are to provide such method and apparatus for efficiently calculating and storing expected access time information substantially without negative effect and that overcome many of the disadvantages of prior art arrangements.

In brief, a method and apparatus are provided for command queue ordering in a direct access storage device (DASD). For each command in a command queue, an access time is calculated. Calculating the access time includes identifying a probability of miss and adding a penalty for the identified probability of miss to the calculated access time. A command in the command queue having a best access time is identified and executed.

In accordance with features of the invention, seek tables and a time-based relocation expected access time (TREAT) table are stored. The seek tables are updated responsive to a successful execution of the identified command without a miss, the actual access time is calculated and used to index into the stored seek table for the read or write seek. The seek length is set to the seek length plus one cylinder if the seek length is greater than or equal to the retrieved seek length. The time-based relocation expected access time (TREAT) table stores for each of a plurality of cylinder groups a respective latency, for example, measured in servo samples (SIDs), for a plurality of selected miss percentages. The TREAT table is updated responsive to executing the identified command. The determination of whether a make or miss occurred is performed. The stored TREAT table entry is then updated according to the following formulas:

Make (no extra revolutions): $x(t+1)=x(t)-y/d$

Miss (one or more extra revs): $x(t+1)=x(t)+(1-y)/d$ where $x(t)$ is the original TREAT table entry, $d$ is the learning rate and $y$ is the target miss percentage for the executed command.

BRIEF DESCRIPTION OF THE DRAWINGS

The present invention together with the above and other objects and advantages may best be understood from the following detailed description of the preferred embodiments of the invention illustrated in the drawings, wherein:

FIG. 1B is a diagram illustrating a prior art expected access time table for implementing hard disk drive command queue ordering;

FIG. 1C is a diagram illustrating an example TREAT table for implementing hard disk drive command queue ordering in accordance with the preferred embodiment;

FIG. 1D is a diagram illustrating an example penalty table for implementing hard disk drive command queue ordering in accordance with the preferred embodiment;

FIGS. 2A, 2B, 2C, and 2D are flow charts illustrating exemplary sequential steps for implementing hard disk drive command queue ordering in accordance with the preferred embodiment.

DETAILED DESCRIPTION OF THE PREFERRED EMBODIMENTS

Figure 1A:
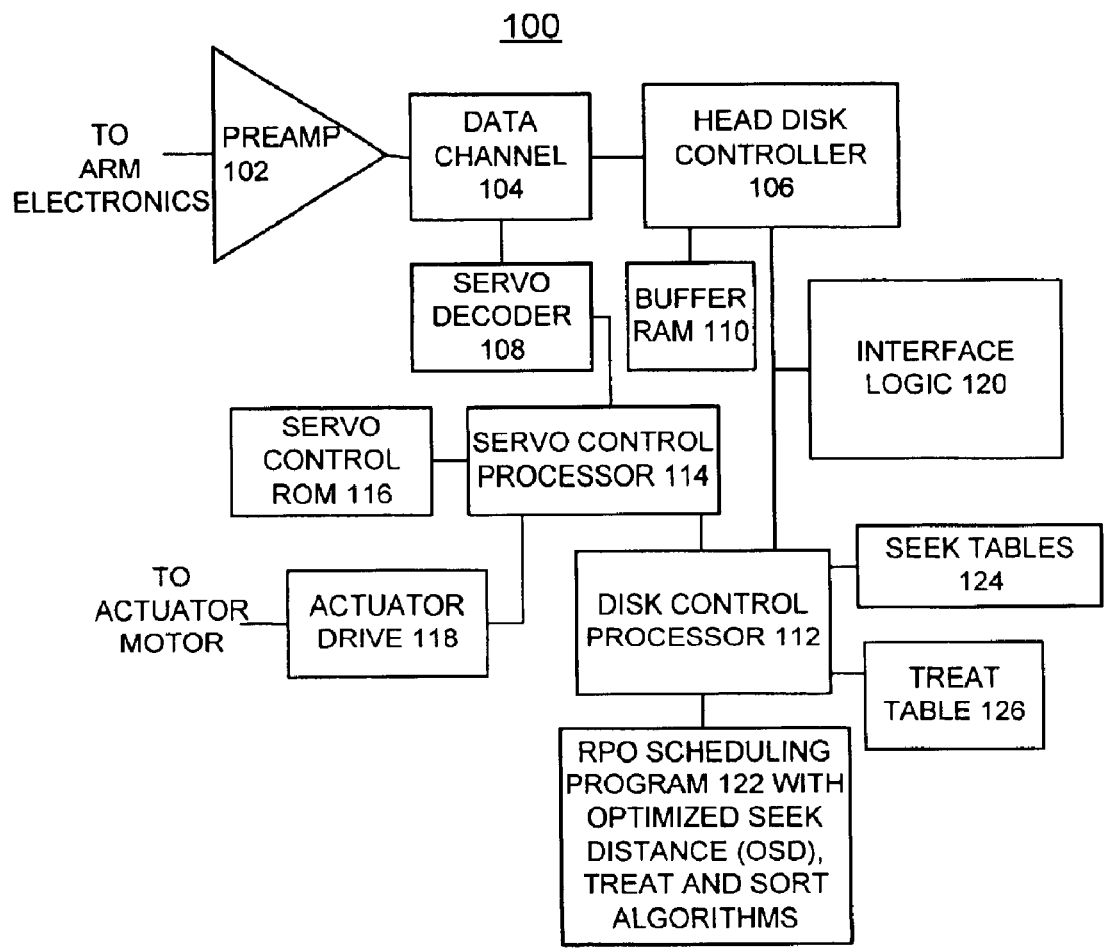
FIG. 1A is a block diagram representation illustrating a disk file system for implementing hard disk drive command queue ordering methods in accordance with the preferred embodiment.

Having reference now to the drawings, in FIG. 1, there is shown a disk file system for carrying out the scheduling method including optimized seek distance algorithm of the preferred embodiment generally designated by the reference character 100. Servo information and customer data are amplified by a preamplifier (preamp) 102. A data channel 104 uses sampling techniques for detecting the readback signals from the disk surfaces that contain the customer data. A head disk controller 106 is coupled to the data channel 104. A servo decoder 108 coupled to the data channel 104 provides a servo timing signal to the head disk controller 106. A buffer random access memory 120 is coupled to the head disk controller 106. A disk control processor 112 is coupled to the head disk controller 106 and to a servo control processor 114. A servo control read only memory (ROM) 116 and an actuator drive 118 are coupled to the servo control processor 114. The servo control processor 114 performs servo control functions providing servo positioning control signals to the actuator driver 118 that is coupled to an actuator motor assembly (not shown). An interface logic 120 coupled to the head disk controller 106 and the disk control processor 112 performs interface logic functions. Scheduling data accesses is provided with a Rotational Position Optimization (RPO) scheduling program 122 including an Optimized Seek Distance (OSD) algorithm, TREAT algorithm, and a Self-Organizing RPO Table (SORT) algorithm of the preferred embodiment coupled to the disk control processor 112. Seek tables 124 and a TREAT table 126 of the preferred embodiment utilized by the RPO scheduling program 122 are coupled to the disk control processor 112. Disk control processor unit 112 is suitably programmed to execute the flow charts of FIGS. 2A, 2B, 2C, and 2D of the preferred embodiment.

Referring now to FIG. 1B, there is shown an example prior art expected access time table for implementing DASD command queue ordering. When the drive's past performance history is stored and retrieved, it is classified according to the major factors that typify it. As shown in FIG. 1B, prior art expected access time table includes two dimensions used in classifying seeks of arrival bands 132 and seek distance or cylinder groups 134. The arrival band 132 represents the difference in latency estimated to exist after the seek is complete. The arrival bands 132 are grouped linearly, while the cylinder groups 134 are grouped such that the same amount of rotational time is represented in each cylinder group. In other words, the groups are created in such a way that each cylinder group 134 corresponds to the same amount of seek table entries. In the prior art seek table 124, no requirements on the relative accuracy of each entry are placed in the seek profile. For example, in some cases the seek profile entry for a given latency may represent a 75% chance of successfully accessing the block without missing and taking an additional revolution. In another case, this could be 40%. For each entry in the arrival band 132 versus cylinder group 134 in the prior art expected access time table, miss and make count values are stored.

Referring now to FIG. 1C, there is shown an example Time-based Relocation Expected Access Time (TREAT) table 126 for implementing DASD command queue ordering in accordance with the preferred embodiment. In FIG. 1C TREAT table 126 includes estimates that are based upon a seek profile. The seek tables 124 give the maximum seek distance reasonably achieved for a given latency. The TREAT table 126 gives a latency typically measured in servo samples (SIDs) relative to the seek profile required to achieve one of a plurality of selected miss percentages, shown as 75%, 50%, 40%, 30%, 20%, 15%, 10%, and 5%. For example, at a 75% probability of missing a 10 cylinder seek, 6 extra SIDs of latency is required relative to the seek profile. As shown in FIG. 1C, the example TREAT table 126 includes a distance value for each of the cylinder groups 134 and a number of accesses for each of the cylinder groups 134. The illustrated distance value is not stored and is calculated on the fly during periodic reorganizations of the TREAT table 126. In addition, the example TREAT table 126 includes a number of accesses for each of the selected miss percentages.

Unlike the prior art seek classification method as illustrated in FIG. 1B, which measures the probability of a miss at predetermined distances of extra latency in SIDs from the seek profile, this invention measures latency or the number of SIDs of extra time required to achieve a predetermined miss rate. In addition, this invention alleviates the need to explicitly track RPO makes and misses as stored in the prior art expected access time table of FIG. 1B.

FIG. 1D illustrates a penalty table 140 in accordance with features of the invention. Penalty table 140 includes the set EAT % probability of missing values 142 stored together with a respective penalty value 144.

In accordance with features of the invention, the RPO scheduling program 122 includes an improved method for calculating an optimized seek distance stored in the seek tables 124 and of establishing and reorganizing a TREAT table 126. The RPO scheduling program 122 of the invention provides improvements in stability, raw storage requirements, compressibility, and drive performance.

In accordance with features of the invention, a method is provided for setting the values in the seek profile, hereafter referred to as the Optimistic Seek Distance (OSD) algorithm. The OSD algorithm itself is very simple and is illustrated in FIG. 2C. After a successful (no miss) read or write, the number of SIDs required to access the first block of the command or the actual access time is determined. Next the read or write seek table 124 is updated by indexing into the seek table for the respective seek type (read or write) with the access time and setting the value in the table to the seek length plus one cylinder if the current seek length is at least as large as that already in the table. In this way, the seek table contains a seek length which has never successfully been traversed in a given amount of latency, though just barely. The net effect of this that the seek table entries represent a value that will result in a 100% chance of a miss. This is an important attribute for the second part of the invention.

The present invention is referred to as a Time-based Relocation Expected Access Time (TREAT) algorithm. Two example cylinder groups from an example TREAT table are provided in the following Table 1:

TABLE 1

| Cylinder Group | TREAT | | | | | | | |
| --- | --- | --- | --- | --- | --- | --- | --- | --- |
|  | 75% | 50% | 40% | 30% | 20% | 15% | 10% | 5% |
| 0–10 | 6 | 12 | 14 | 15 | 17 | 18 | 20 | 24 |
| 11–50 | 7 | 10 | 12 | 13 | 16 | 20 | 21 | 22 |

In the above example, the Table 1 indicates that in order to have a 20% probability of missing a 8 cylinder seek, 17 extra SIDs of latency is required relative to the seek profile. The calculation of extra latency for the command is identified as the distance in SIDs from the end of the currently executing command until the start of the target command and is used to index into the appropriate seek table 124. If the entry in the table is less than the seek length of the command, one revolution's worth of SIDs is added to the latency and the table is referenced again. Once the seek length entry is larger than the actual seek length, prior seek table entries are queried until the seek entry is less than the actual seek length. The difference between the original point and this point constitutes the extra latency.

For each command in the queue that RPO examines and for which an EAT needs to be calculated, the cylinder group is searched (binary or otherwise) to find the proper entry which matches the amount of extra latency. In cases where an exact match is not found, either the worst-case entry can be used or interpolation between entries can be done. In the later case, this should improve the accuracy of the estimate. Given the fixed nature of the TREAT miss percentages, the actual penalty associated with choosing a command can be precalculated, leading to an improvement in execution time, as illustrated in FIG. 1D. The penalty calculation is provided as:

$$\text{Penalty} = \text{Miss \%} * SIDs/Rev$$

where SIDs represents servo IDs (SIDs) a drive with 500 SIDs/Rev would have the predefined table found below:

TABLE 2

Penalty Table

| EAT %→ | 75% | 50% | 40% | 30% | 20% | 15% | 10% | 5% |
|---|---|---|---|---|---|---|---|---|
| Penalty (SIDs)→ | 375 | 250 | 200 | 150 | 100 | 75 | 50 | 25 |

In accordance with features of the invention, the TREAT table entries are updated as follows. The TREAT entry's location used to calculate the EAT for a command is stored prior to the command's execution. The determination of whether a make or miss occurred is performed. The stored TREAT entry is then updated according to the following formulas:

Make (no extra revolutions): $x(t+1) = x(t) - y/d$

Miss (one or more extra revs): $x(t+1) = x(t) + (1-y)/d$ where x(t) is the original table entry, d is the learning rate and y is the target miss %.

These formulas insure that the SID offset in the TREAT table 126 correlates to the probability of success that closely matches the target miss %. Although not critical to the invention, the information below illustrates how one would implement and minimize the size of the TREAT table 126:

The actual number stored in the TREAT table 126 may be slightly different than that exemplified in the above table for systems wishing to conserve as much memory as possible. This is due to the fact that both y/d and (1−y)/d must be at least one when using a fixed representation of the number. If not, then only one of the make/miss conditions will actually result in a tangible change in the TREAT entry, leading to an inaccurate, runaway condition. As an example, if 5% is the smallest tracked miss rate, the learning rate is d=2 and the target system wishes to use 8 bits to store each table value. In this case, we must solve for y in y/d=1, giving y=2 in this case. Therefore 2 equates to 5% or each 2.5%=1. This gives a static update value to be added to the prior entry for each miss % as defined below:

TABLE 3

TREAT

|  | 75% | 50% | 40% | 30% | 20% | 15% | 10% | 5% |
|---|---|---|---|---|---|---|---|---|
| Make | −15 | −10 | −8 | −6 | −4 | −3 | −2 | −1 |
| Miss | +4 | +10 | +12 | +14 | +16 | +17 | +18 | +19 |

The actual range defined by the 8 bits depends on the range needed to reach the smallest target miss rate. In this particular example, if one wanted to be able to represent a full 255 SID offset, the individual updates would be too large (especially in the case of a 5% miss, where a 19 SID adjustment would occur). In practice, it would be necessary to constrain the largest possible update to a fraction of a SID. With the largest potential update being 19 in this example, using the lower 5 bits of the number to represent the fractional part should be sufficient. This only leaves 3 bits for the whole SID numbers, allowing 0–7 SIDs as the dynamic range. As this is very likely insufficient to describe the range of uncertainty, alternative representations may be necessary. One possible alternative is to allow each entry to delta off of the prior entry in the table. For example, one might envision the following table, which contains the same information as the first table, but in a slightly different form:

TABLE 4

TREAT

| Cylinder Group | 75% | 50% | 40% | 30% | 20% | 15% | 10% | 5% |
|---|---|---|---|---|---|---|---|---|
| 0–10 | 6 | 6 | 2 | 1 | 2 | 1 | 2 | 4 |
| 11–50 | 7 | 3 | 2 | 1 | 3 | 4 | 1 | 1 |

In order to calculate the required number of SIDs to achieve a given miss %, all prior entries in the column must be added together resulting in the following Table 5:

TABLE 5

TREAT

| Cylinder Group | 75% | 50% | 40% | 30% | 20% | 15% | 10% | 5% |
|---|---|---|---|---|---|---|---|---|
| 0–10 | 6 | 12 | 14 | 15 | 17 | 18 | 20 | 24 |
| 11–50 | 7 | 10 | 12 | 13 | 16 | 20 | 21 | 22 |

This has the advantage of increasing the dynamic range, but it does require additional computation.

Figure 2A:
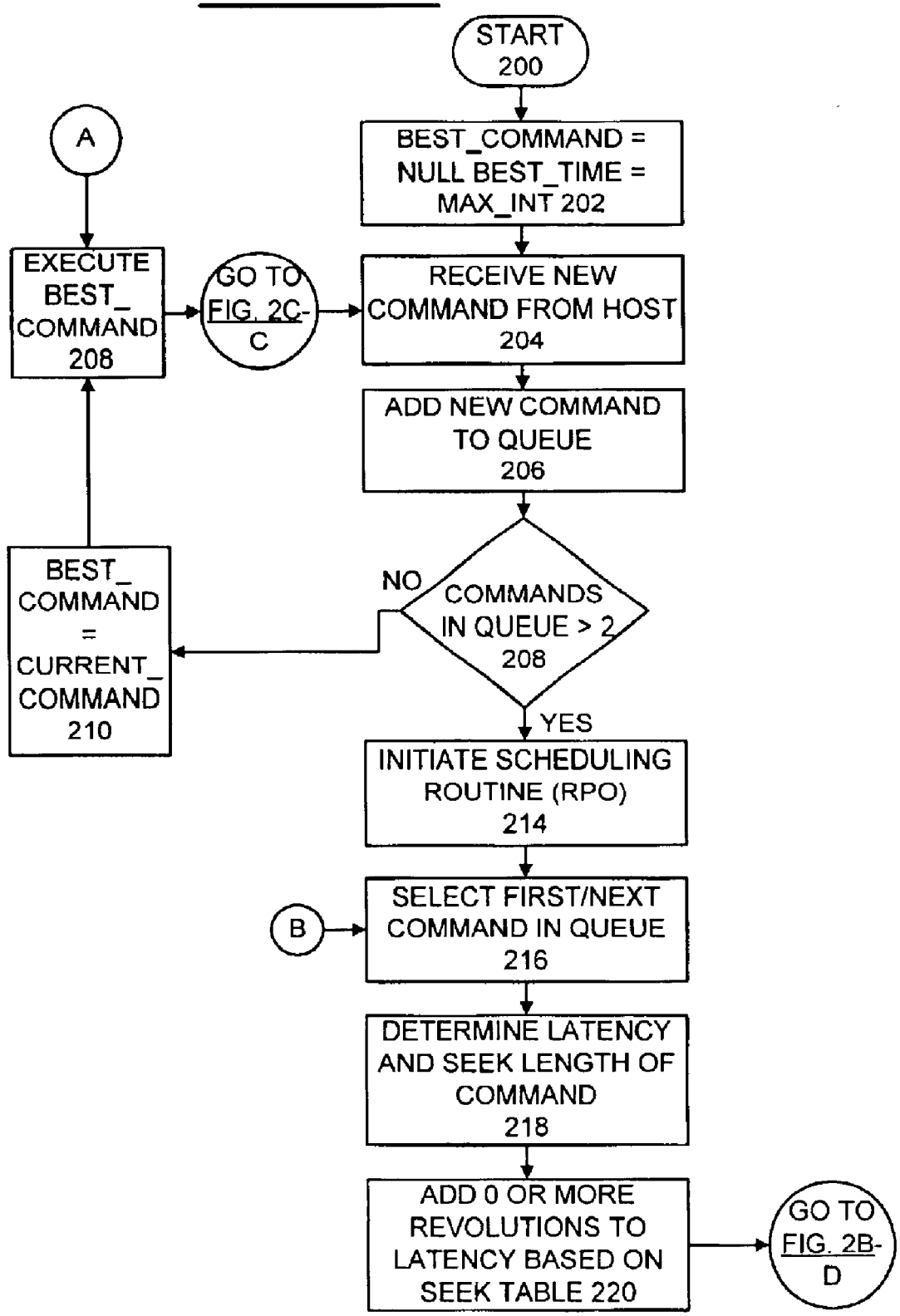
Figure 2B:
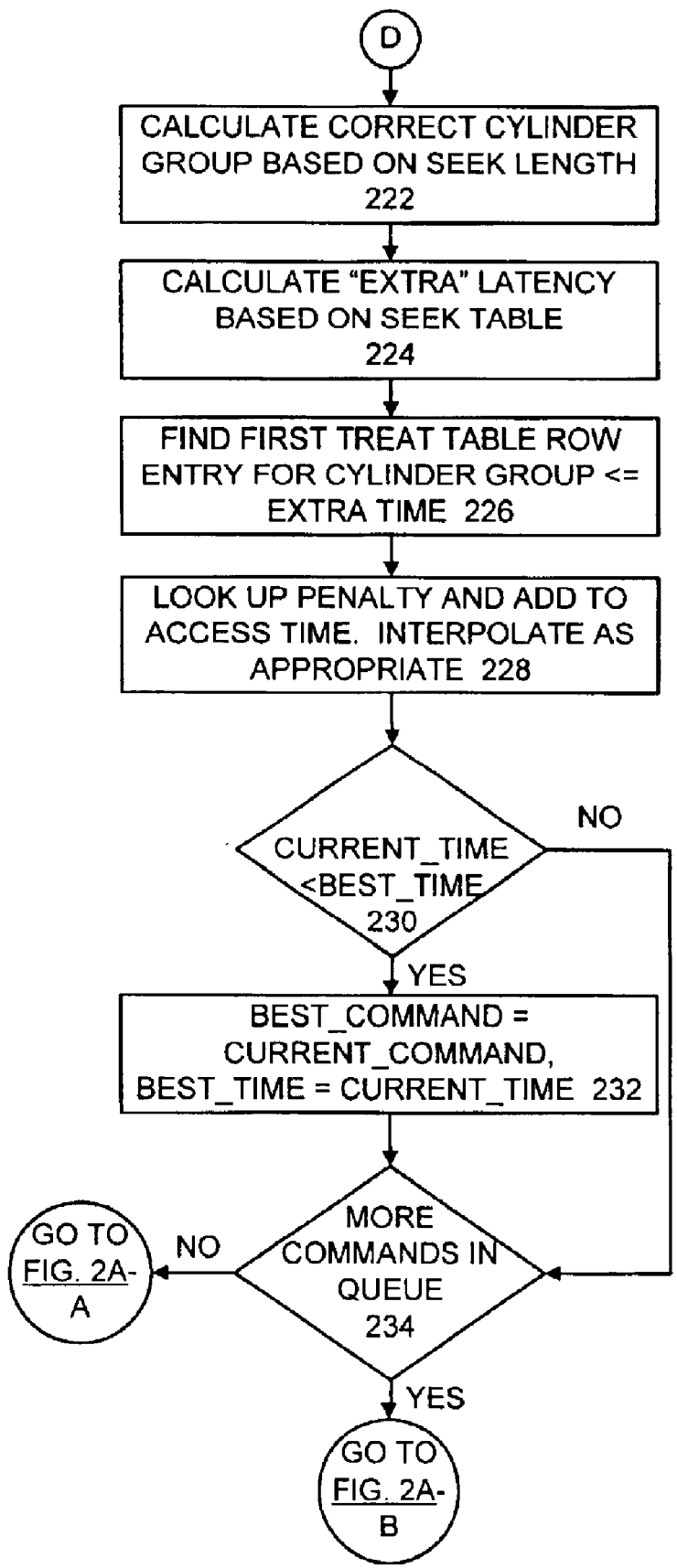
Figure 2D:
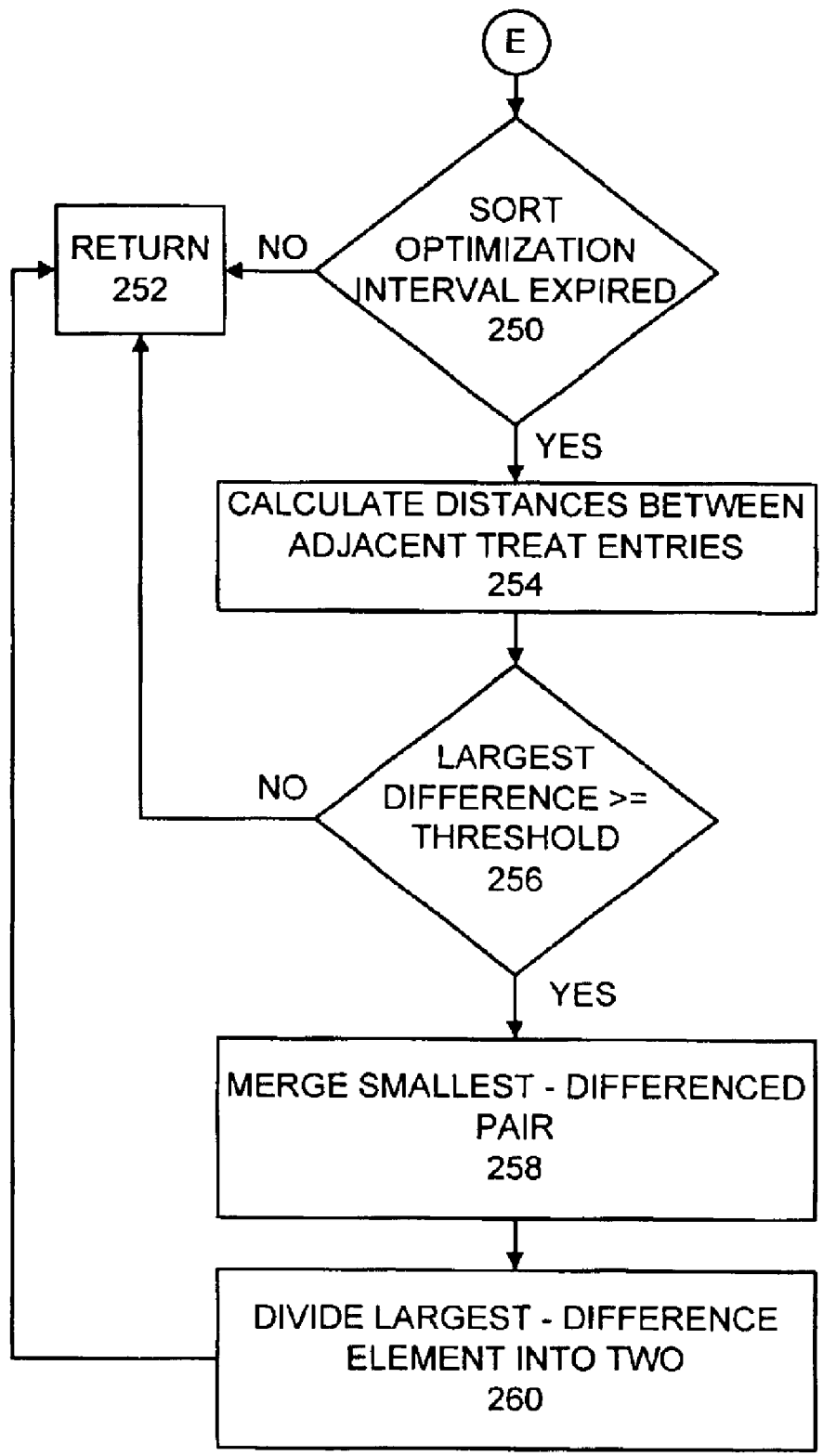

In accordance with features of the invention, the RPO scheduling program 122 includes an improved method for reorganizing a TREAT table as illustrated and described with respect to FIG. 2D. The RPO scheduling program 122 of the invention periodically reorganizes the TREAT table 126 by splitting and combining sections of the TREAT table 126. A Self-Organizing RPO Table (SORT) algorithm is implemented for reorganizing the table structure on the fly, maximizing the seek model's accuracy and thus the overall drive performance for a given amount of table space.

At a predefined interval, for example, measured in a number of operations or clock time, the SORT algorithm examines the TREAT table 126 to determine the cylinder groups 134 or candidates to be split and the candidates to be merged. For example, consider the TREAT table values illustrated in the TREAT table 126 of FIG. 1C. The SORT algorithm examines the TREAT table 126 of FIG. 1C and the SORT algorithm needs a distance measure to make the comparison to determine the cylinder groups 134 or candidates to be split and the candidates to be merged. An example distance value is labeled DIST. is provided in FIG. 1C that is equal to the sum of all the absolute differences between the individual entries in each cylinder group 134. It should be understood that other distance values could be used, for example, the squared difference would also be used.

Using the absolute difference as the measure, FIG. 1C illustrates the distance for each cylinder group 134 relative to the next cylinder group in the column labeled DIST. In this example, the distance between the 11–50 cylinder group 134 and the 51–100 cylinder group 134 is the largest. The smallest distance is between the 401–550 and the 551–625 cylinder groups 134. The largest inter-group distance group is split while the smallest inter-group distance group is merged, for example, providing an updated TREAT table 126 as shown in the following Table 6. An alternative mechanism could use cylinder groups 134 on each side to determine which groups to merge and which groups to split, allowing the minimization of the maximum distance between groups.

TABLE 6

| Cylinder Group 134 | TREAT | | | | | | | |
|---|---|---|---|---|---|---|---|---|
| | 75% | 50% | 40% | 30% | 20% | 15% | 10% | 5% |
| 0–10 | 6 | 12 | 14 | 15 | 17 | 18 | 20 | 24 |
| 11–30 | 7 | 10 | 12 | 13 | 16 | 20 | 21 | 22 |
| 31–75 | 10 | 13 | 15 | 17 | 20 | 24 | 26 | 29 |
| 76–100 | 12 | 15 | 18 | 21 | 24 | 27 | 30 | 35 |
| 101–175 | 8 | 11 | 12 | 14 | 17 | 21 | 22 | 23 |
| 176–275 | 12 | 13 | 14 | 16 | 18 | 29 | 24 | 28 |
| 276–400 | 9 | 10 | 11 | 14 | 16 | 18 | 22 | 26 |
| 401–625 | 6 | 9 | 10 | 13 | 14 | 18 | 20 | 23 |
| * * * | | | | | | | | |

In general, the following exemplary rules are applied in order to split two groups into three groups. First, the first group starts at its original starting point and ends half-way through its original group. Second, the second group starts at the half-way point of the original first group plus one cylinder and ends half-way into the next group. Third, the third group starts at its half-way point plus one cylinder and ends at its original ending point. Fourth, each entry in the new group is equal to the average of the parent groups' entries, rounding to the more pessimistic number, for example, rounding the average entries values to the next higher number. Fifth, each entry in the parent groups remains unchanged.

In general, the following exemplary rules are applied in order to combine two groups into one group. First, the new combined group starts at the beginning of the first group and ends at the end of the second group. Second, the entries in the new group are equal to the average of the parent groups' entries, rounding to the more pessimistic number. Applying the above rules to split and combine groups results in the above Table 6 starting from the initial TREAT table 126 of FIG. 1C.

The distance measure between entries also could be weighted in an advantageous manner. One weighting measure involves taking the distance measure and multiplying the distance measure by a ratio of the number of executed commands that came from a particular cylinder group, or other tracking variable, versus the total number of executed commands. The column providing a number of accesses for each cylinder group 134 labeled NO. OF ACCESSES illustrates this weighting measure in the TREAT table 126 of FIG. 1C. This weighting measure has the effect of giving greater importance to those regions or cylinder groups 134 of the TREAT table 126 that are utilized most.

This same line of reasoning could be used to weight by the ratio of executed commands that come from each column entry or each miss % column versus the total number of executed commands. The row providing a number of accesses for each miss % column labeled NO. OF ACCESSES illustrates this weighting measure in the TREAT table 126 of FIG. 1C. In this example weighting measure, a greater distance weighting is given to those table entries with low miss percentages. These and other weighting factors could be scaled to influence their overall power to determine the groups to split and to combine. This is particularly important in providing an effective overall model and can be used, for example, to minimize missed revolutions rather than overall throughput.

It should be understood that various methods could be implemented with the SORT algorithm, such as, to constrain maximum size of a cylinder group 134 or other parameter; and to establish thresholds to determine if splitting and combining should be performed. Additional extensions can be provided; for example, to age access numbers to more readily respond to workload changes; to use non-linear techniques to reallocate variable ranges on cylinder group splits; to allow space to be shared or allocated between multiple tables, such as read and write tables could compete for the same table storage space; and for categorical variable labels, such as head number, where the number is an arbitrary assignment and a search beyond adjacent heads could be performed without involving additional calculation.

Referring now to FIGS. 2A, 2B, 2C and 2D, there are shown exemplary sequential steps for implementing hard disk drive command queue ordering in accordance with the preferred embodiment. In FIG. 2A sequential steps start at a block 200. A best command is set to null and a best time is set equal to a MAX_INT as indicated in a block 202. A new command from the host is received as indicated in a block 204. The new command from the host is added to the queue as indicated in a block 206. Checking whether more than two commands are in the queue is performed as indicated in a decision block 208. If not, then the best command is set to the current command as indicated in a block 210. Then the best command is executed as indicated in a block 212. Then the sequential operations return to block 204 to receive a new command for the host following performing the steps of FIGS. 3C and 3D following entry point C in FIG. 3C.

When more than two commands are in the queue, then a scheduling routine or a Rotational Position Optimization (RPO) is initiated as indicated in a block 214. A first/next command in the queue is selected as indicated in a block 216. Next a latency time and an estimated seek length of the selected command is determined as indicated in a block 218. Zero or more revolutions are added to the latency based on the seek table as indicated in a block 220. Then the sequential operations continue in FIG. 2B following entry point D.

Referring to FIG. 2B following entry point D, a correct cylinder group is calculated based on the seek length of the selected command as indicated in a block 222. An extra latency is calculated based on the seek table entry as indicated in a block 224. A first TREAT table row entry for the cylinder group less than or equal to the calculated extra time or latency is identified as indicated in a block 226. A penalty is looked up and added to the access time and interpolated as appropriate as indicated in a block 228. Checking whether the current time is less than the best time is performed as indicated in a decision block 230. When the current time is less than the best time, then the best command is set to the current command and the best time is set to the current time as indicated in a block 232. When the current time is not less than the best time or after the best command is set to the current command at block 232, then checking for more commands in the queue is performed as indicated in a decision block 234. When there are more commands in the queue, then the sequential steps continue following entry point B in FIG. 2A. When there are no more commands in the queue, then the sequential steps continue following entry point A in FIG. 2A.

Referring now to FIG. 2C, the sequential steps following the best command execution at block 208 in FIG. 2A start following entry point C with the actual access time being calculated as indicated in a block 236. The seek distance associated with the access time is retrieved from the read or write seek table 124 as indicated in a block 238. Checking whether the current seek distance is greater than or equal to the retrieved seek distance is performed as indicated in a decision block 240. When the current seek distance is greater than or equal to the retrieved seek distance, then the seek table access time is set equal to the current seek distance plus one cylinder as indicated in a block 242. Otherwise or after the seek table access time is set, checking whether the command executed in the expected number of revolutions is performed as indicated in a decision block 244. If the command did not execute in the expected number of revolutions or a miss occurred then, the treat entry is updated to equal the treat_entry plus (1−target_miss_%)/learning rate as indicated in a block 246 as set forth in the following equation:

$$\text{Miss (one or more extra revs): } x(t+1)=x(t)+(1-y)/d$$

where x(t) is the original table entry, d is the learning rate and y is the target miss %.

Otherwise when the command executed in the expected number of revolutions or a make occurred then, the treat entry is updated to equal the treat_entry minus target_miss_%/learning rate as indicated in a block 248 as set forth in the following equation:

$$\text{Make (no extra revolutions): } x(t+1)=x(t)-y/d$$

Then the sequential steps continue following entry point E in FIG. 2D.

Referring now to FIG. 2D, exemplary sequential steps of the SORT algorithm are shown. First, checking whether the SORT optimization interval has expired is performed as indicated in a decision block 250. When the SORT optimization interval has not expired, then the steps are completed and return as indicated in a block 252. Otherwise, when the SORT optimization interval has expired, distances between adjacent TREAT entries in the TREAT table 126 are calculated as indicated in a block 254. The calculated distances are compared to a threshold as indicated in a decision block 256. When the calculated distances are less than the threshold, then the steps are completed and return at block 252. When the calculated distances are greater than or equal to the threshold, then the smallest differenced pair is merged as indicated in a block 258. Next the largest difference element, such as largest difference cylinder group 134 is split into two as indicated in a block 260. Then the steps are completed and return at block 252.

Figure 3:
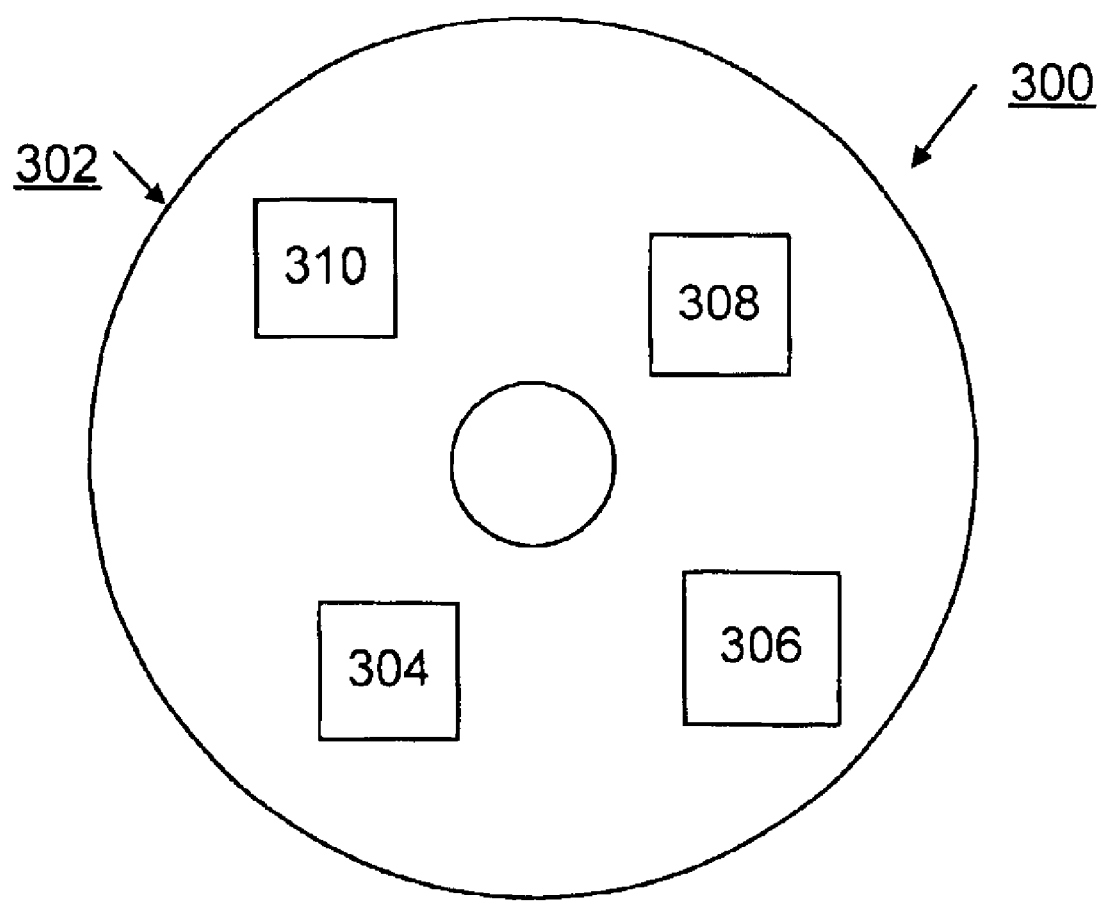
FIG. 3 is a block diagram illustrating a computer program product in accordance with the preferred embodiment.

Referring now to FIG. 3, an article of manufacture or a computer program product 300 of the invention is illustrated. The computer program product 300 includes a recording medium 302, such as, a floppy disk, a high capacity read only memory in the form of an optically read compact disk or CD-ROM, a tape, a transmission type media such as a digital or analog communications link, or a similar computer program product. Recording medium 302 stores program means 304, 306, 308, 310 on the medium 302 for carrying out the methods for implementing hard disk drive command queue ordering of the preferred embodiment in the disk file system 100 of FIG. 1.

A sequence of program instructions or a logical assembly of one or more interrelated modules defined by the recorded program means 304, 306, 308, 310, direct the disk file system 100 for implementing hard disk drive command queue ordering of the preferred embodiment.

While the present invention has been described with reference to the details of the embodiments of the invention shown in the drawing, these details are not intended to limit the scope of the invention as claimed in the appended claims.

What is claimed is:

1. A method for command queue ordering in a direct access storage device (DASD) comprising the steps of:
for each command in a command queue, calculating an access time including identifying a probability of miss and adding a penalty for said identified probability of miss to calculate said access time;
identifying a command in said command queue having a best access time;
executing said identified command having said at best access time;
storing a seek classification table including a plurality of cylinder groups, each cylinder group including a respective latency for each of a plurality of selected percentages of a probability of a miss; identifying a predefined optimization interval; and
reorganizing selected cylinder groups of said plurality of cylinder groups of said seek classification table.

2. A method for command queue ordering in a direct access storage device (DASD) as recited in claim 1 further includes the steps responsive to executing said identified command having said best access time, of calculating an actual access time for said identified command; retrieving a seek distance associated with said calculated actual access time from a seek table and comparing said retrieved seek distance and a seek distance for said identified command.

3. A method for command queue ordering in a direct access storage device (DASD) as recited in claim 2 further includes the steps of updating a seek table access time responsive to said compared values.

4. A method for command queue ordering in a direct access storage device (DASD) as recited in claim 3 wherein the step of updating said seek table access time responsive to said compared values includes the step of setting said seek table access time equal to said seek distance for said identified command plus one cylinder responsive to said seek distance for said identified command being greater than or equal to said retrieved seek distance.

5. A method for command queue ordering in a direct access storage device (DASD) as recited in claim 1 further includes the steps of updating a stored time-based relocation expected access time (TREAT) seek classification table responsive to executing said identified command having said best access time.

6. A method for command queue ordering in a direct access storage device (DASD) as recited in claim 5 wherein said TREAT seek classification table stores for each of a plurality of cylinder groups a respective latency for each of a plurality of selected percentages of a probability of a miss.

7. A method for command queue ordering in a direct access storage device (DASD) as recited in claim 5 wherein the step of updating a store time-based relocation expected access time (TREAT) seek classification table responsive to executing said identified command includes the steps of identifying execution of said identified command in an expected number of revolutions; and updating TREAT table entry according to the following equation:

$$x(t+1)=x(t)-y/d$$

where x(t) is an original table entry, d is the learning rate and y is a target miss percentage for said executed command.

8. A method for command queue ordering in a direct access storage device (DASD) as recited in claim 5 wherein the step of updating a store time-based relocation expected access time (TREAT) seek classification table responsive to executing said identified command includes the steps of identifying execution of said identified command in more than an expected number of revolutions; an updating a TREAT table entry according to the following equation:

$$x(t+1)=x(t)+(1-y)/d,$$

where x(t) is an original table entry, d is the learning rate and y is a target miss percentage for said executed command.

9. Apparatus for command queue ordering in a direct access storage device (DASD) comprising:
  a processor;
  a seek classification table coupled to said processor; said seek classification table including a plurality of cylinder groups, each cylinder group including a respective latency for each of a plurality of selected percentages of a probability of miss;
  said processor for each command in a command queue, for calculating an access time including identifying a probability of miss utilizing said seek classification table and adding a penalty for said identified probability of miss to calculate said access time;
  said processor for identifying a command in said command queue having a best access time; and
  said processor for executing said identified command having said best access time.

10. Apparatus for command queue ordering in a direct access storage device (DASD) as recited in claim 9 wherein said processor is for determining whether said command executed in an expected number of revolutions.

11. Apparatus for commend queue ordering in a direct access storage device (DASD) as recited in claim 10 wherein said processor is responsive to said executed command executing in said expected number of revolutions, for calculating an actual access time for said identified command.

12. Apparatus for command queue ordering in a direct access storage device (DASD) as recited in claim 11 wherein said processor is for retrieving a seek distance associated with said calculated actual access time from a seek table and comparing said retrieved seek distance and a seek distance for said identified command.

13. Apparatus for command queue ordering in a direct access storage device (DASD) as recited in claim 12 wherein said processor is for updating a seek table access time responsive to said compared values.

14. Apparatus for command queue ordering in a direct access storage device (DASD) as recited in claim 10 wherein said processor is responsive to said executed command executing in said expected number of revolutions, for updating a seek classification table entry according to the following equation:

$$x(t+1)=x(t)-y/d,$$

where x(t) is an original seek classification table entry, d is a learning rate and y is a target miss percentage for said executed command.

15. Apparatus for command queue ordering in a direct access storage device (DASD) as recited in claim 10 wherein said processor is responsive to said executed command executing in more than said expected number of revolutions, for updating a seek classification table entry according to the following equation:

$$i\ x(t+1)=x(t)+(1-y)/d,$$

where x(t) is an original seek classification table entry, d is a learning rate and y is a target miss percentage for said executed command.

16. A computer program product for command queue ordering in a direct access storage device (DASD) including a processor unit, said computer program product including a plurality of computer executable instructions stored on a computer readable medium, wherein said instructions, when executed by said processor unit, cause the processor unit to perform the steps of:
  storing a seek classification table including a plurality of cylinder groups, each cylinder group including a respective latency for each of a plurality of selected percentages of a probability of a miss;
  for each command in a command queue, calculating an access time including identifying a probability of miss and adding a penalty for said identified probability of miss to calculate said access time;
  identifying a command in said command queue having a best access time; and
  executing said identified command having said best access time.

17. A computer program product for command queue ordering in a direct access storage device (DASD) as recited in claim 16 wherein said instructions, when executed by said processor unit, cause the processor unit to perform the steps of: determining whether said executed command executed in an expected number of revolutions and updating a seek classification table entry for said identified probability of miss of said executed command.

18. A computer program product for command queue ordering in a direct access storage device (DASD) as recited in claim 17 wherein said instructions, when executed by said processor unit, cause the processor unit to perform the steps of: responsive to said executed command executing in said expected number of revolutions, calculating an actual access time for said identified command; retrieving a seek distance associated with said calculated actual access time from a seek table and comparing said retrieved seek distance and a seek distance for said identified command; and updating a seek distance entry in said seek table responsive to said compared values.

19. A computer program product for command queue ordering in a direct access storage device (DASD) as recited in claim 16 wherein said instructions, when executed by said processor unit, cause the processor unit to perform the steps of: identifying a predefined optimization interval; and reorganizing selected cylinder groups of said plurality of cylinder groups of said seek classification table.

* * * * *